(12) United States Patent
Antes et al.

(10) Patent No.: US 10,784,740 B2
(45) Date of Patent: Sep. 22, 2020

(54) DRIVE WITH A COMMUTATOR MOTOR

(71) Applicant: Bühler Motor GmbH, Nuremberg (DE)

(72) Inventors: Michael Antes, Keunreuth (DE); Bernd Reinecker, Nuremberg (DE); Georg Bernreuther, Nuremberg (DE)

(73) Assignee: BÜHLER MOTOR GMBH, Nürnberg (DE)

( * ) Notice: Subject to any disclaimer, the term of this patent is extended or adjusted under 35 U.S.C. 154(b) by 0 days.

(21) Appl. No.: 16/242,477

(22) Filed: Jan. 8, 2019

(65) Prior Publication Data
US 2019/0214877 A1 Jul. 11, 2019

(30) Foreign Application Priority Data
Jan. 9, 2018 (DE) .................. 10 2018 200 195

(51) Int. Cl.
*H02K 13/10* (2006.01)
*H01R 12/53* (2011.01)
(Continued)

(52) U.S. Cl.
CPC ............. *H02K 5/143* (2013.01); *E06B 9/307* (2013.01); *E06B 9/322* (2013.01); *E06B 9/68* (2013.01); *H01R 39/36* (2013.01); *H02K 5/148* (2013.01); *H02K 5/225* (2013.01); *H02K 11/026* (2013.01); *H02K 11/33* (2016.01); *H02K 13/10* (2013.01); *H02K 23/66* (2013.01);
(Continued)

(58) Field of Classification Search
CPC ........ H01R 39/36; H01R 39/14; H01R 39/18; H01R 39/24; H01R 39/26; H01R 39/27; H01R 39/32; H01R 39/34; H01R 39/39; H01R 39/62; H01R 4/2426; H01R 12/53; H01R 39/381; H02K 5/143; H02K 5/148; H02K 11/026; H02K 5/22; H02K 5/225; H02K 5/24; H02K 13/10; H02K 23/66; H02K 11/33; E06B 9/307; E06B 2009/285; E06B 9/322; E06B 9/68
USPC ......................................................... 310/71
See application file for complete search history.

(56) References Cited

U.S. PATENT DOCUMENTS 2,637,826 A * 5/1953 Humphrey ............. H02K 5/148
                                                              310/247
3,148,295 A * 9/1964 Paxton ................... H01R 39/36
                                                              310/249
(Continued)

FOREIGN PATENT DOCUMENTS

DE     39 12 873 A1    11/1989
DE    199 54 733 A1     5/2001
FR     2 908 245 A1     5/2008

OTHER PUBLICATIONS

Search Report dated Oct. 24, 2018, issued in counterpart German Patent Application No. 10 2018 200 195.2 (5 pages).

*Primary Examiner* — Quyen P Leung
*Assistant Examiner* — Alexander A Singh
(74) *Attorney, Agent, or Firm* — Westerman, Hattori, Daniels & Adrian, LLP

(57) ABSTRACT

A drive including a commutator motor having a motor housing, an end shield secured to the housing, feedthroughs defined in the end shield, brushes mounted in the feedthroughs; and at least one stranded conductor forming a direct electrical and mechanical connection between a brush and the terminal contact arranged outside the motor housing.

16 Claims, 4 Drawing Sheets

(51) Int. Cl.
  *H01R 39/36* (2006.01)
  *H02K 5/14* (2006.01)
  *E06B 9/322* (2006.01)
  *E06B 9/68* (2006.01)
  *H02K 23/66* (2006.01)
  *H02K 11/33* (2016.01)
  *E06B 9/307* (2006.01)
  *H02K 5/22* (2006.01)
  *H02K 11/026* (2016.01)
  *H01R 4/2429* (2018.01)
  *H01R 39/38* (2006.01)
  *E06B 9/28* (2006.01)

(52) U.S. Cl.
  CPC ...... *E06B 2009/285* (2013.01); *H01R 4/2429* (2013.01); *H01R 12/53* (2013.01); *H01R 39/381* (2013.01)

(56) References Cited

U.S. PATENT DOCUMENTS

| | | | |
|---|---|---|---|
| 4,853,568 A * | 8/1989 | Fujiwara | H02K 5/225 310/68 C |
| 4,926,078 A | 5/1990 | Isozumi et al. | |
| 4,985,654 A | 1/1991 | Morikane | |
| 6,478,613 B1 * | 11/2002 | Zoell | H01R 13/533 417/410.1 |
| 2011/0095659 A1 * | 4/2011 | Hattori | F04B 39/121 310/68 D |
| 2012/0091839 A1 * | 4/2012 | Hein | H02K 5/225 310/71 |
| 2016/0099623 A1 * | 4/2016 | Bohm | H01R 12/585 310/43 |
| 2019/0036427 A1 * | 1/2019 | Luo | H01R 39/36 |

* cited by examiner

DRIVE WITH A COMMUTATOR MOTOR

CROSS-REFERENCE TO RELATED APPLICATIONS

The present patent application claims priority from, German Application No. DE 10 2018 200 195.2, filed Jan. 9, 2018, and which is incorporated herein by reference in its entirety.

BACKGROUND OF THE INVENTION

(1) Field of the Invention

The invention relates to a drive having a commutator motor with a motor housing, an end shield, brushes, which can be connected via stranded conductors to a voltage source.

(2) Description of Related Art Including Information Disclosed Under 37 CRF 1.97 and 1.98

Drives of this type are used, for example, for driving roller blinds and Venetian blinds in the interior of buildings. An essential feature of these drives consists in that they generally have to have a significant self-locking torque in order to exhibit sufficient resistance against the gravity of the roller blind or the Venetian blind and thus against undesired movement during motor standstill. Electric motors for this purpose are accordingly designed such that they have a high cogging torque. Cogging torques cause unpleasant noises during operation, which are perceived as very disturbing, especially when used in closed spaces. As a remedial measure, cogging-torque-minimizing motors can be used, which then generally need a brake against the effect of gravity. This solution is often not reasonable from an economic point of view. Noise-damping intermediate layers between the electric motor and a surrounding drive housing are routinely used to suppress the motor noises. In order to ensure the decoupling effect even in the electrical supply lines to the electric motor, these lines can be designed as flexible conductors. The motor generally has connecting lugs or connecting plugs to which a cable is connected by soldering or by a plug connection. Several contact points and connecting lines connected one behind the other increase the electrical resistance with a negative influence on efficiency and energy consumption. In battery-operated roller blind drives, the energy store is usually dimensioned such that it only needs to be changed or charged once per year. In an inefficient drive, the battery is however discharged prematurely.

In order to avoid this, the object of the present invention is to provide a drive with increased electro-mechanical efficiency, in which optimum structure-borne noise decoupling between the commutator motor and the drive housing can be realized.

BRIEF SUMMARY OF THE INVENTION

Since at least one stranded conductor forms a direct electrical connection between a brush and a terminal contact arranged outside the motor housing, the number of contact points is minimized and the line resistance is reduced thereby. Another advantage consists in fewer components having to be produced and mounted. The stranded conductors consist of a copper braid, are very flexible, and transmit almost no noise.

According to a feature of the invention, the terminal contact is arranged on a conductor plate or is formed by a conductor path on the conductor plate. In this case, a soldered connection is useful. This once again reduces the number of components and contact points.

It is expedient that not only one but also at least two brushes are electrically connected via one stranded conductor each directly to the conductor plate or to a terminal contact on the conductor plate. If more than two brushes are present, it is provided that all brushes are electrically connected with a stranded conductor directly to a terminal contact outside the commutator motor. Optimum decoupling can only be achieved in this way.

A particularly advantageous embodiment of the invention is given by the brush being a carbon brush and the stranded conductor being embedded in the brush. Carbon brushes are generally pressed from powder material into a powder form. It is also customary to insert stranded conductors into the powder material before the pressing process and then to press them in together. A very good electrical and a very good mechanical connection can be produced thereby.

A further development of the invention provides that the terminal contact is an insulation displacement contact. As a result, the stranded conductor can be connected very quickly and securely to the conductor plate.

In order to easily connect the terminal contact to the conductor plate, a press-in contact section is provided which is pressed into a bore created in the conductor plate. The bore is to be produced as a metallized bore around an electrical contact with the press-in contact section.

A variant provides that at least one stranded conductor is welded directly to the conductor plate. In a further variant, at least one stranded conductor is connected to the conductor plate by a crimping connection, wherein the stranded conductor is crimped to the terminal contact. It is ultimately also conceivable for the terminal contact to be a micro-quadlock plug or a similar commercially available contact which is crimped or welded to the stranded conductor.

In order to avoid short circuits between two stranded conductors, the end shield is provided with one feedthrough for each stranded conductor. The feedthrough and thus the outgoing stranded conductor line is in this case aligned axially, diagonally, or radially. Radial alignment is preferred in this case.

For the same reason, the end shield is made of an insulating material, preferably a plastic material. With suitable laying of the stranded conductors, insulation of the same can be dispensed with. If insulation is required, a stranded conductor or both stranded conductors can be provided with an insulating tube, which can also be slipped on loosely.

A particularly preferred development of the invention provides that the brushes are mounted radially from outside. This eliminates having to thread the stranded conductors through the feedthrough. In order to allow the stranded conductors to follow the advancing brushes when the brush is wearing away, the feedthroughs are of slot-like design.

For the sake of simplicity, the end shield is designed as a brush carrier plate, wherein the brush guides also consist of the electrically insulating material of the end shield. It is advantageous if the feedthrough extends up to a brush shaft for receiving and guiding the brush.

It is furthermore provided that the feedthrough continues on the opposite side of the brush shaft as spring receiving pocket. Received therein can be a leg of a brush pressure spring, which can be pre-stretched and locked until the brush is mounted.

For reasons of installation space optimization, the conductor plate is arranged parallel to a motor axis. In this sense, the motor axis is the axis of rotation of a rotor mounted in the end shield.

In order to achieve as functional an arrangement of the stranded conductors as possible, it is proposed that the brushes are aligned and guided parallel to the conductor plate and move parallel to the conductor plate in case of wear, as a result of which the stranded conductors can optimally move in the slot-like feedthrough on both sides of the conductor plate and the line lengths of the two stranded conductors are the same.

It is provided that the terminal contacts are arranged on the side of the conductor plate facing away from the motor. It is, therefore, expedient for the stranded conductor to be laid around the edges of the conductor plate. The length of the carbon wires is dimensioned such that a slight loop is produced and tensile stress is prevented.

The drive according to the invention is preferably used as a roller blind or Venetian blind drive, in particular internal drives with battery operation.

BRIEF DESCRIPTION OF THE SEVERAL VIEWS OF THE DRAWINGS

An exemplary embodiment of the invention is explained in more detail below with reference to the drawing. The following is shown.

Figure 1:
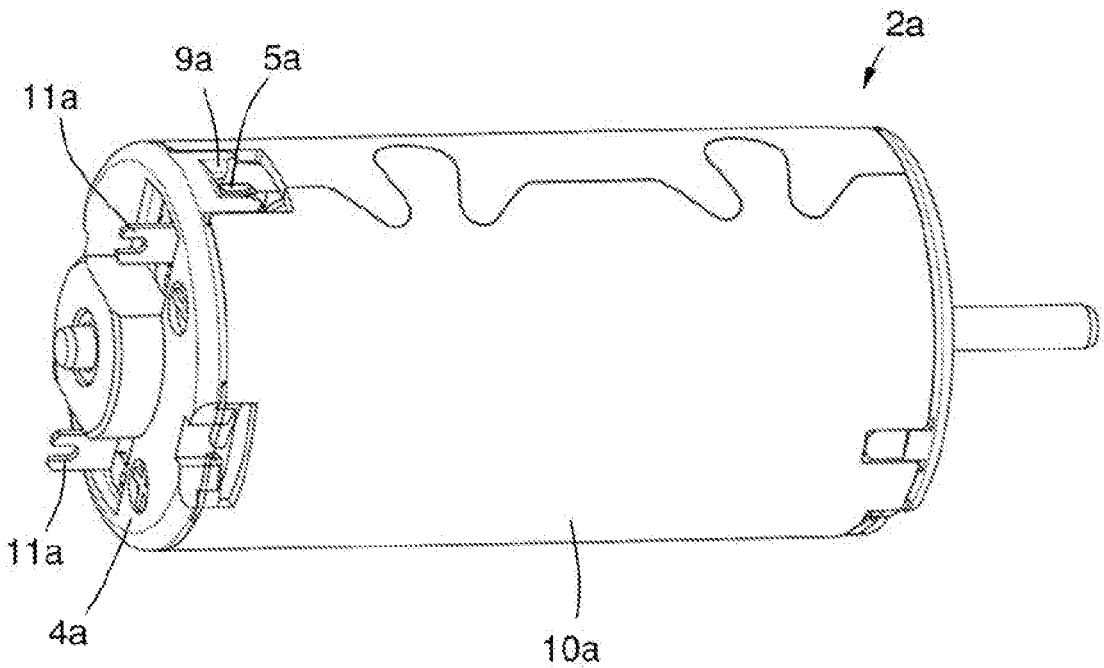
FIG. 1 is a perspective view of a commutator motor according to the prior art.

Note: The reference signs with index and the corresponding reference signs without index refer to details with the same name in the drawings and the drawing description. This reflects use in another embodiment or the prior art, and/or where the detail is a variant.

DETAILED DESCRIPTION OF THE INVENTION

In describing preferred embodiments of the present invention illustrated in the drawings, specific terminology is employed for the sake of clarity. However, the invention is not intended to be limited to the specific terminology so selected, and it is to be understood that each specific element includes all technical equivalents that operate in a similar manner to accomplish a similar purpose.

FIG. 1 shows a commutator motor 2a according to the prior art, with a motor housing 10a, an end shield 4a, and terminal lugs 11a. Conductor means can be soldered, welded, or slipped onto the terminal lugs. Feedthroughs 9a are provided through which brushes 5 can be mounted radially.

Figure 2:
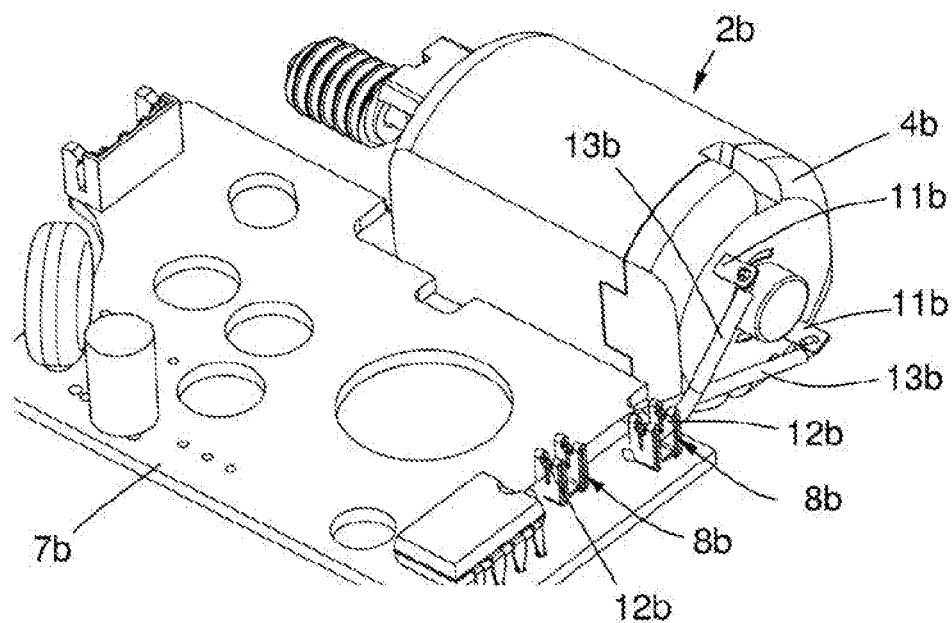
FIG. 2 is a perspective view of a commutator motor according to the prior art connected to a conductor plate.

FIG. 2 shows a commutator motor 2b connected to a conductor plate 7b. Terminal contacts 8b having insulation displacement sections 12b are pressed into the conductor plate 7b. Flexible motor connecting lines 13b are inserted into the insulation displacement sections 12b and connected thereto electrically. Although the flexible motor connecting lines dampen vibrations of the commutator motor, the high number of contacts (brush—connecting lug, connecting lug—motor connecting line, motor connecting line—terminal contact, terminal contact—conductor plate, etc.) increases electrical resistance and reduces electrical efficiency.

Figure 3:
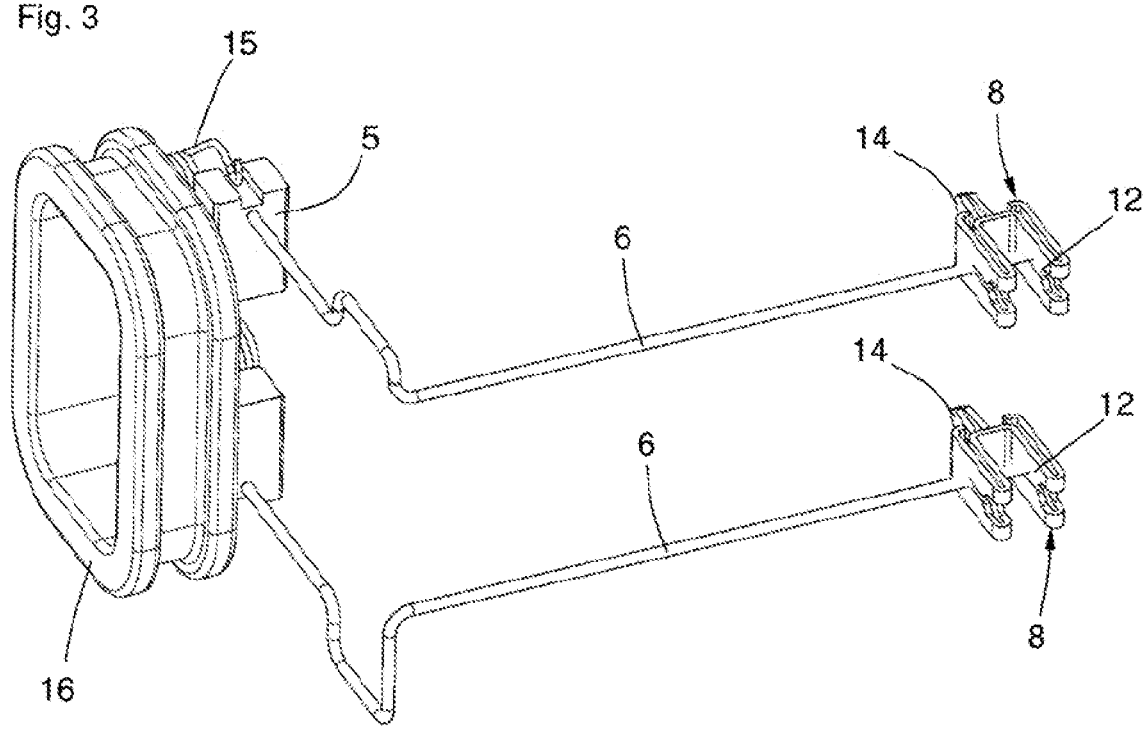
FIG. 3 is a perspective representation of two stranded conductors with their connections in an embodiment of the invention.

FIG. 3 shows a representation of two stranded conductors 6 with their connections. On one side, the stranded conductors 6 are embedded in brushes 5. In this case, the stranded conductors 6 are embedded by inserting them into a carbon powder material and pressing the material. In the process, a firm electrical and mechanical connection between the stranded conductor 6 and the brush 5 is produced. On the other side, the stranded conductors 6 are each inserted into an insulation displacement section 12 of a terminal contact 8 and electrically connected thereto. Press-in sections 14 are provided on the side of the terminal contact 8 facing away from the insulation displacement section 12 and pressed into a conductor plate, whereby an electrical contact is produced. Also illustrated is a brush pressure spring 15 in the form of a leg spring, which presses the brush 5 radially inwardly and constitutes a damping element 16. The described components are arranged in the correct position. For the sake of clarity, the end shield, the commutator motor, and the conductor plate are omitted.

Figure 4:
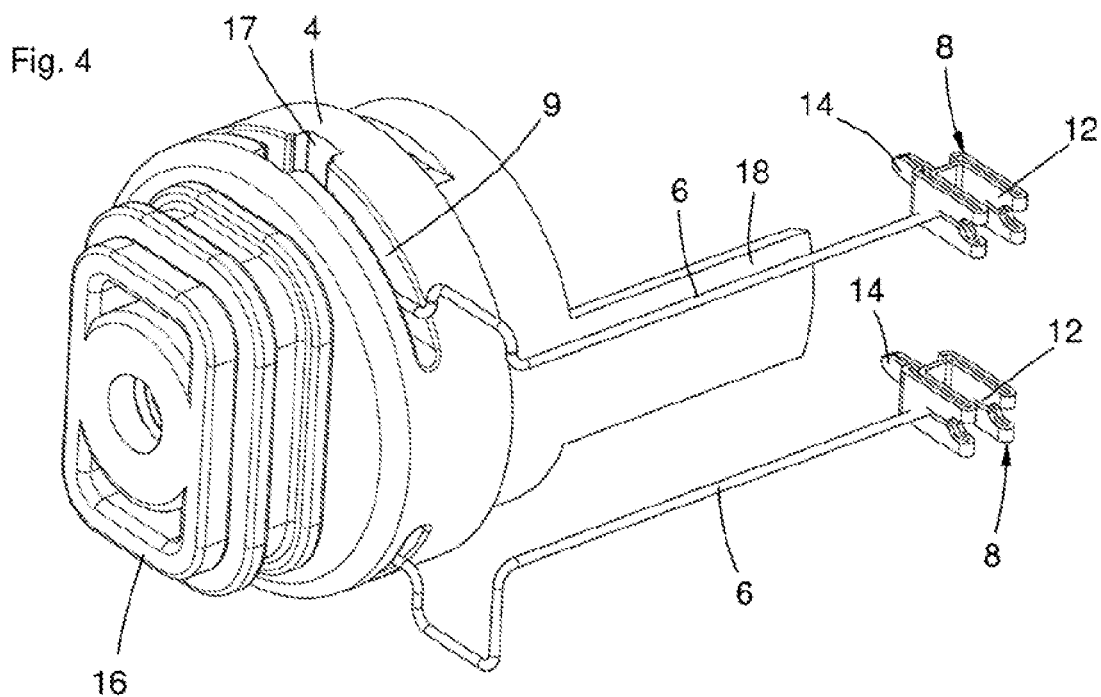
FIG. 4 is a perspective representation according to FIG. 3 with an end shield.

FIG. 4 shows a representation according to FIG. 3 with end shield 4, which is shown in addition to the stranded conductors 6, the terminal contacts 8, and the damping element 16. The end shield 4 has feedthroughs 9 for the stranded conductors 6, the feedthroughs 9 being of slot-like design in order to give the stranded conductors 6 sufficient freedom of movement for feeding toward the wearing brushes. The feedthroughs 9 are axially expanded in the region of the brushes and thus form brush shafts 17 in which the brushes are radially guided and movable. The end shield 4 has an anti-rotation section 18 which can be inserted in a known manner between two magnet shells of a stator.

Figure 5:
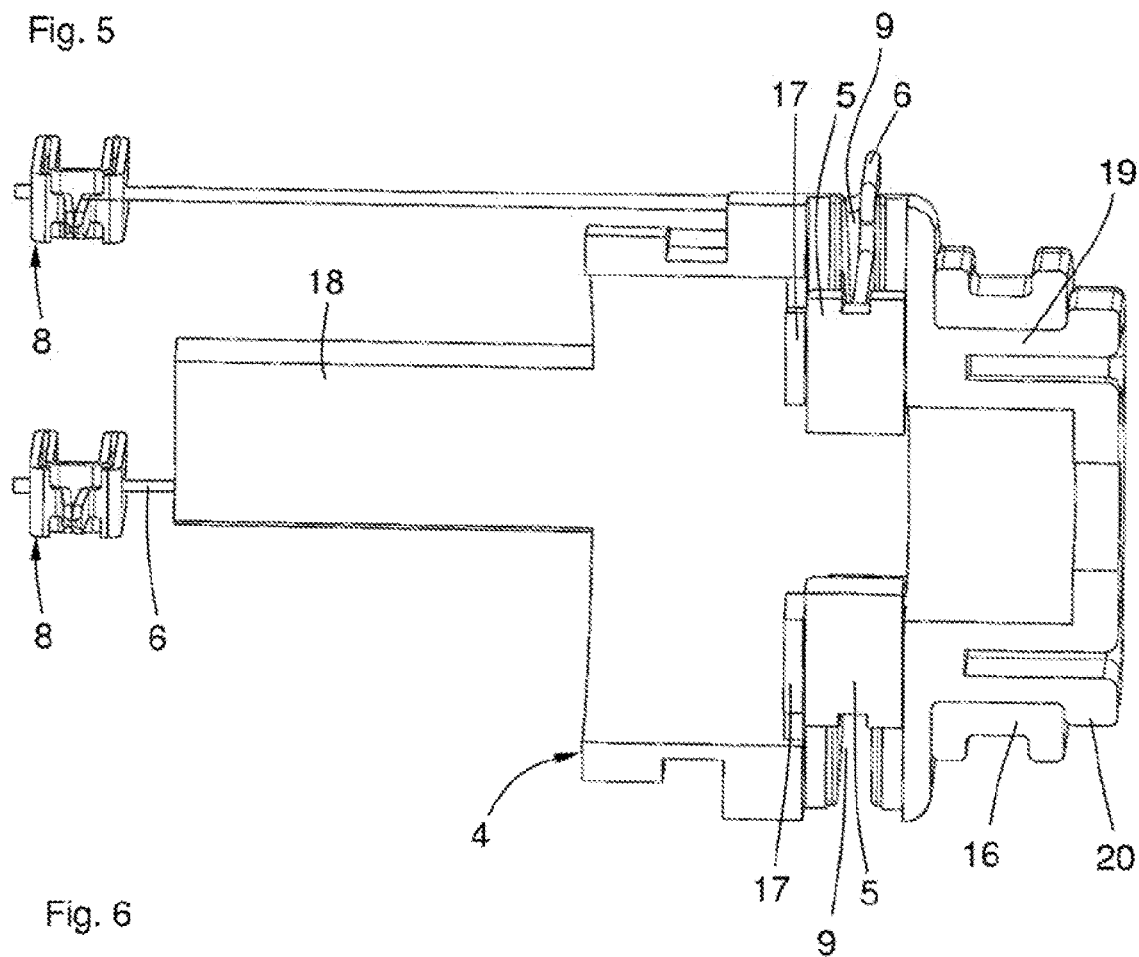
FIG. 5 is a sectional view of the end shield of FIG. 3.

FIG. 5 shows a sectional view of the end shield 4, with the brush shafts 17, the brushes 5, the stranded conductors 6, the terminal contacts 8, the feedthroughs 9, the anti-rotation element, and the damping element 16 which is accommodated in an annular projection 19. The damping element 16 is axially secured in position by an annular extension 20.

Figure 6:
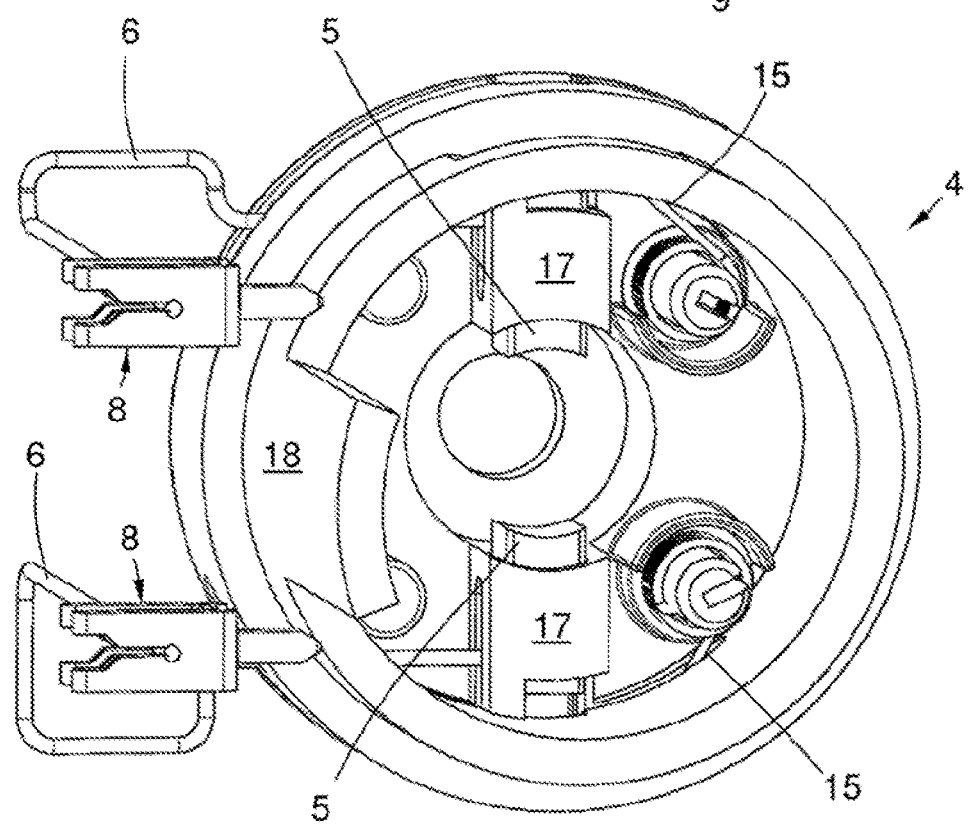
FIG. 6 is an interior view of the end shield of FIG. 5.

FIG. 6 shows an interior view of the end shield 4, with the brush shafts 17, the anti-rotation section 18, the brushes, the brush pressure springs 15, the stranded conductors 6, and the terminal contacts 8.

Figure 7:
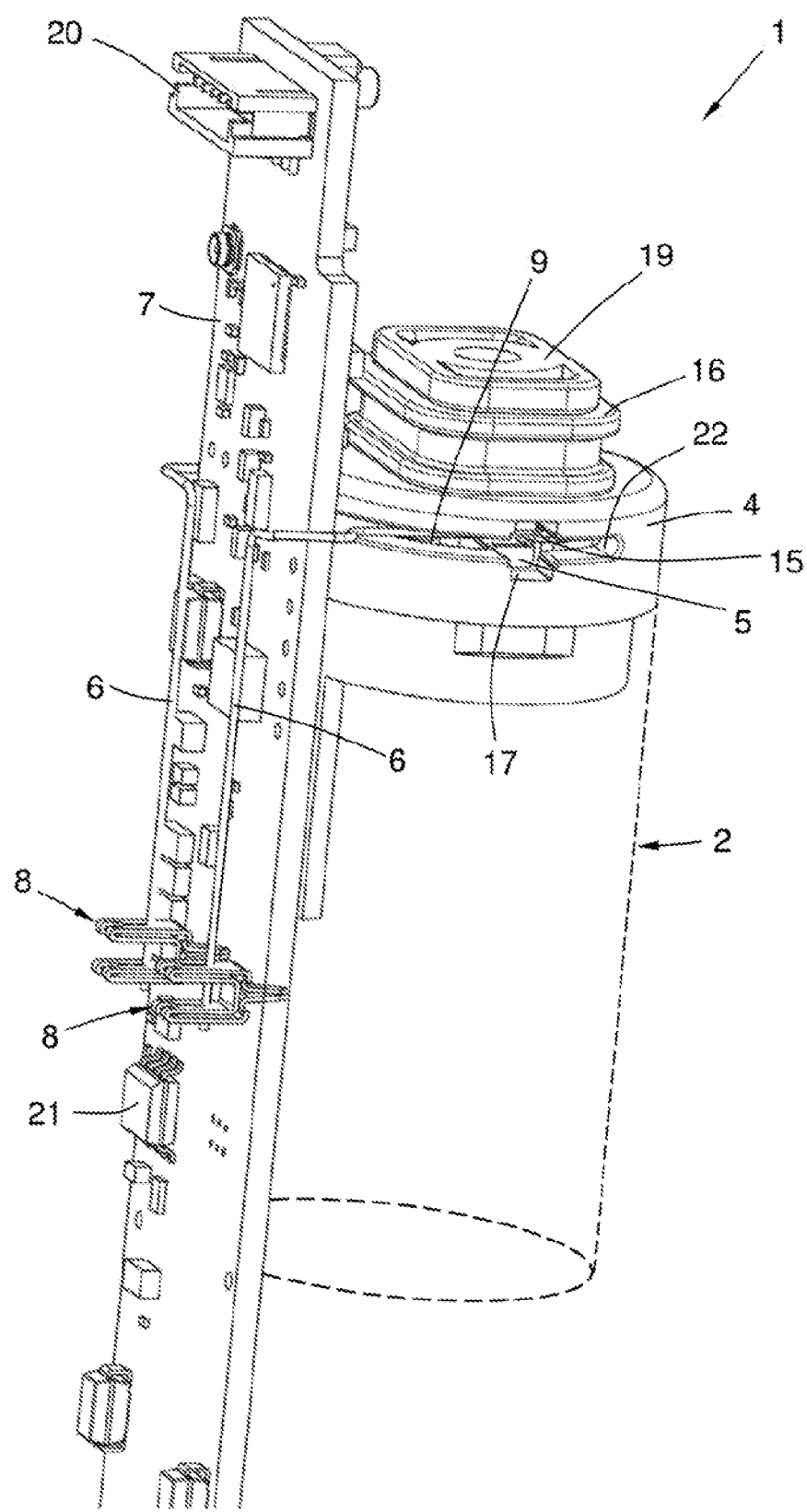
FIG. 7 is a partial representation of a drive with electric motor and conductor plate according to the present invention.

FIG. 7 shows a partial view of a drive 1 with indicated electric motor 2 (dashed line), the end shield 4, and the conductor plate 7. In the end shield 4, the brushes 5 are aligned and guided such that they move in parallel to the conductor plate 7 in case of wear. As a result, the stranded conductors 6 can be guided to the conductor plate at right angles to the conductor plate. Subsequently, the stranded conductors 6 are laid around an edge of the conductor plate 7 and guided to the terminal contacts 8. The slot-like feedthrough 9 is expanded in order to receive the leg of the brush pressure spring 15. For easier mounting of the brushes 5, the leg of the brush pressure spring 15 can be stretched in the end shield and retained in its position in a form-fit manner until the brush is inserted (not shown). The conductor plate 7 carries components of an electrical control circuit for the roller blind and a connecting plug 20. Furthermore shown is the damping element 16 which is accommodated on the projection of the end shield 4.

Modifications and variations of the above-described embodiments of the present invention are possible, as appreciated by those skilled in the art in light of the above teachings. It is therefore to be understood that, within the scope of the appended claims and their equivalents, the invention may be practiced otherwise than as specifically described.

LIST OF REFERENCE NUMBERS

1 Drive
2 Commutator motor
3 Motor housing
4 End shield
5 Brush
6 Stranded conductor
7 Conductor plate
8 Terminal contact
9 Feedthrough
10 Motor housing
11 Connecting lug
12 Insulation displacement section
13 Motor connecting line
14 Press-in section
15 Brush pressure spring
16 Damping element
17 Brush shaft
18 Anti-rotation section
19 Projection
20 Connecting plug
21 Component
22 Spring receiving pocket

What is claimed is:

1. A drive electrically connected to a terminal contact, the drive comprising:
a commutator motor having a motor housing and a motor axis;
a plurality of terminal contacts arranged outside the motor housing;
an end shield secured to the motor housing;
a plurality of elongated feedthroughs defined in the end shield, wherein each of the elongated feedthroughs is an elongated slot;
the end shield acting as a brush carrier by having a plurality of brush shafts defined in the end shield;
each of the elongated feedthroughs extending to one of the brush shafts;
a spring receiving pocket defined in each of the elongated feedthroughs near the respective brush shaft;
a pressure spring located in each spring receiving pocket;
a brush mounted in each brush shaft and held in place by one of the pressure springs; and
at least one stranded conductor forming a direct electrical and mechanical connection between a brush and a terminal contact.

2. The drive according to claim 1, further comprising a conductor plate, wherein each terminal contact is arranged on the conductor plate.

3. The drive according to claim 2, wherein at least two brushes are electrically connected via a stranded conductor directly to the conductor plate or to the terminal contact on the conductor plate.

4. The drive according to claim 3, wherein the terminal contact is a micro-quadlock plug crimped or welded to the stranded conductor.

5. The drive according to claim 2, wherein the terminal contact has a press-in contact section which is pressed into a bore defined on the conductor plate.

6. The drive according to claim 2, wherein at least one stranded conductor is directly welded to the conductor plate.

7. The drive according to claim 2, wherein at least one stranded conductor is connected by a crimp connection to the conductor plate, or wherein the stranded conductor is crimped to the terminal contact.

8. The drive according to claim 2, wherein the conductor plate is arranged parallel to the motor axis.

9. The drive according to claim 8, wherein the brushes are aligned and guided parallel to the conductor plate and move parallel to the conductor plate as the brushes wear.

10. The drive according to claim 2, wherein the stranded conductor is guided around an edge of the conductor plate.

11. The drive according to claim 1, wherein each brush is a carbon brush and the stranded conductor is embedded in each brush.

12. The drive according to claim 1, wherein the terminal contact is an insulation displacement contact.

13. The drive according to at least one of claim 1, wherein a stranded conductor extends through each of the elongated feedthroughs of the end shield, wherein each of the elongated feedthroughs are aligned axially, diagonally, or radially.

14. The drive according to claim 1, wherein the end shield consists of an electrically insulating material.

15. The drive according to claim 14, wherein the brushes can be mounted radially from the outside.

16. The drive according to claim 1, wherein the drive is a roller blind or a Venetian blind drive.

* * * * *